Figure 8:
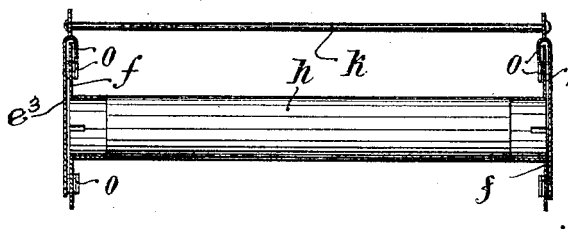

No. 774,061. PATENTED NOV. 1, 1904.
H. FRITZSCHE.
FILM SPOOL FOR PHOTOGRAPHIC CAMERAS.
APPLICATION FILED MAR. 24, 1903.
NO MODEL. 2 SHEETS—SHEET 1.
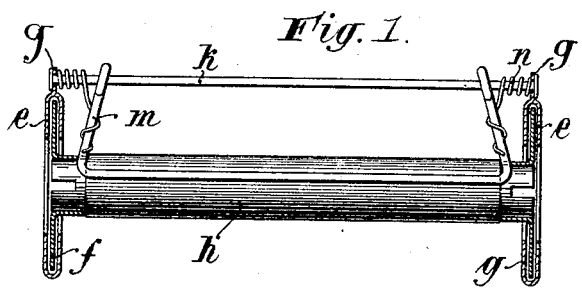
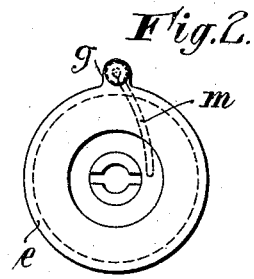
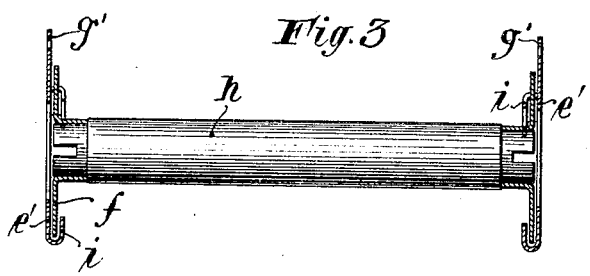
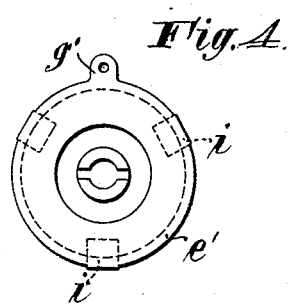
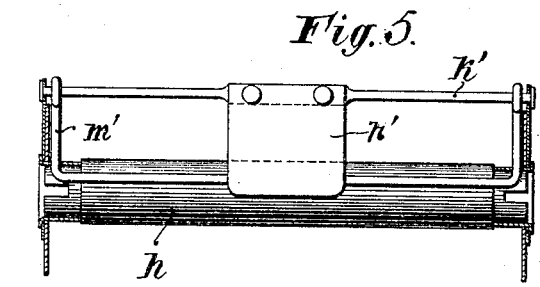
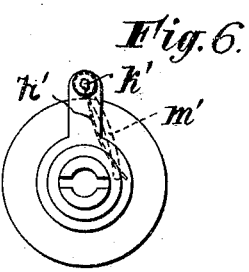
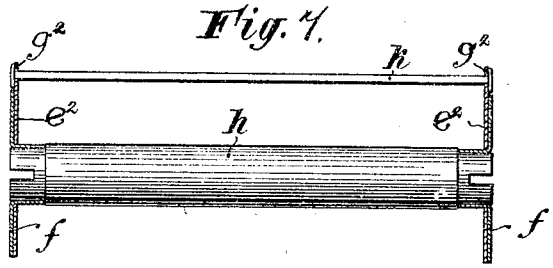
Witnesses:
L. Staaden.
M. E. Dismond.
Inventor:
Hugo Fritzsche,
per Alfred Miller,
Atty.

No. 774,061. PATENTED NOV. 1, 1904.
H. FRITZSCHE.
FILM SPOOL FOR PHOTOGRAPHIC CAMERAS.
APPLICATION FILED MAR. 24, 1903.
NO MODEL. 2 SHEETS—SHEET 2.

Witnesses:
L. Staaden.
M. E. Dismond.

Inventor,
Hugo Fritzsche
per Alfred Miller
Atty.

No. 774,061.   Patented November 1, 1904.

UNITED STATES PATENT OFFICE.

HUGO FRITZSCHE, OF LEIPZIG, GERMANY.

FILM-SPOOL FOR PHOTOGRAPHIC CAMERAS.

SPECIFICATION forming part of Letters Patent No. 774,061, dated November 1, 1904.

Application filed March 24, 1903. Serial No. 149,252. (No model.)

*To all whom it may concern:*

Be it known that I, HUGO FRITZSCHE, a subject of the King of Saxony, residing at Leipzig, in the Kingdom of Saxony, German Empire, have invented certain new and useful Improvements in Film-Spools for Photographic Cameras, of which the following is a specification.

My invention relates to a device on photographic film-spools for the purpose of preventing the film unwinding automatically. Such spiral unrolling is very liable to occur in inserting a spool into the camera or removing it from the latter, wherefore the use of spools has been attended with trouble, especially when an exposed portion of film is to be separated from the unexposed part.

The purpose of my invention is to effectively prevent the band of film from automatically unwinding by pressing the wound roll of film, no matter what the diameter and position, tightly against the cylinder of the spool by means of a clamp. In this manner the spool is kept constantly under spring-pressure, only the unrolled part of the band being relieved, while the remaining portion, still wound on the spool, is under the action of the spring-clamp, whereby automatic turning and unrolling of the film is prevented.

A further purpose is to provide an attachment or device for photographic film-spools and the like of this character which will be simple, strong, and durable, inexpensive to manufacture, and well adapted to the use for which it is designed.

To the accomplishment of these purposes and such others as may hereinafter appear my invention comprises a photographic film-spool embodying the novel features of construction, combinations of elements, and arrangement of parts hereinafter described, and particularly pointed out in the appended claims.

In the accompanying drawings, in which similar reference characters denote similar parts throughout the several views, several forms of the device are illustrated disclosing the preferred embodiments thereof, the principle in every case being that spring-pressure is exercised upon the spool of film.

Figure 9:
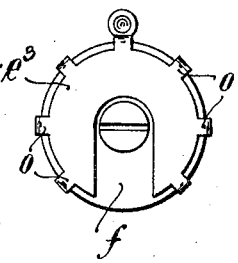
Figure 10:
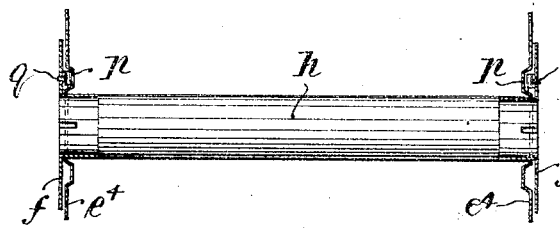
Figure 11:
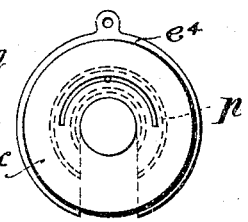

In the drawings, Figure 1 is a longitudinal sectional view showing a spool provided with a clamping-frame. Fig. 2 is an end view of Fig. 1. Fig. 3 is a view similar to Fig. 1, showing a modification of the clamping-frame. Fig. 4 is an end view of Fig. 3. Fig. 5 is a longitudinal view of a modification of the device shown in Fig. 1. Fig. 6 is an end view of Fig. 5. Fig. 7 is a longitudinal view of another modification. Fig. 8 is a longitudinal view illustrating a fourth modification. Fig. 9 is an end view of Fig. 8. Fig. 10 is a longitudinal view of a fifth modification, and Fig. 11 is an end view of Fig. 10.

Referring to the embodiment illustrated by Figs. 1 and 2 of the drawings, $h$ represents a spool-holder, preferably formed of wood, on which the film-band is wound, and is provided with end plates $f$, preferably of metal. Surrounding these plates $f$ and embracing the same are other end plates, $e$, each provided with a suitable ear or lug $g$, to which is suitably secured a rod $k$, carrying a wire frame $m$, provided with springs $n$, which tend to press the springs against the film-roll mounted on the holder $h$, and so prevent the filling from unrolling.

The modification shown in Figs. 3 and 4 is similar in all respects to the above with the exception of the outer end plates. The spool-holder $h$ is provided with end plates $f$, and instead of embracing these end plates with a second outer plate a plate $e'$ is provided having a series of lugs $i$ adapted to be bent inwardly and grip the plate $f$, thus holding plate $e'$ in position. Ears or lugs $g'$ are provided on plate $e'$ for the reception of rod $k$ or $k'$. (Not shown in these views.)

The modification shown in Figs. 5 and 6 is distinguished by a plate-spring $n'$, attached to a rod $k'$, having bearings in a pair of end plates, as usual, and constructed to bear upon wire frame $m'$ and press the same against the film-roll mounted on the holder $h$.

In Fig. 7 there is disclosed the usual rollholder $h$, provided with end plates $f$, and to these are permanently secured other end plates $e^2$, formed with lugs $g^2$ for the reception of a rod $k$, which may be provided with either of the forms of spring-holder heretofore described.

As shown by Figs. 8 and 9, if desired the end plates carrying the rod $k$ (designated by $e^3$) may be secured to the end plates $f$ by slotting the former and providing lugs $o$ on the periphery, which when bent over the edge of end plate $f$ firmly unite the parts. Rod $k$ is mounted in the usual manner.

A further modification of the slotted end plate is shown in Figs. 10 and 11, wherein said plate (designated by $e^4$) is provided with a semicircular slide $p$ instead of the lugs $o$, in which works a lug $q$, secured to the plate. The usual means are provided for mounting the rod $k$, on which any desired form of spring-presser may be used.

The film-holder may be made of any suitable material—such as thin sheet metal, celluloid, or the like—and may be of any desired form.

While my invention has been described with particular reference to the details of construction, I would have it understood that it is not to be limited thereto, as many and various changes, alterations, and substitutions may be made therein and still fall within its scope and principle; but What I do claim, and desire to secure by Letters Patent of the United States, is—

1. A device for preventing spooled films from unrolling comprising a spool, and spring means permanently mounted on the spool itself and adapted to continuously press the roll of film upon the spool, substantially as described.

2. A device for preventing spooled films from unrolling, comprising lateral arms, mounted on the spool and a rod, connecting the said arms and carrying a spring, permanently pressing the roll of film upon the spool, substantially as set forth.

3. A device for preventing spooled films from unrolling, comprising lateral arms, mounted on the spool, a rod, connecting the said arms and carrying a spring, and an angularly-bent wire so disposed and located as to receive the pressure of the spring and to equally distribute the spring-pressure to the whole width of the film, essentially as set forth.

In testimony whereof I have signed my name to this specification in the presence of two subscribing witnesses.

HUGO FRITZSCHE.

Witnesses:
PAUL MÜLLER,
LUDWIG KLEIN.